US011937558B2

(12) United States Patent
Ishida

(10) Patent No.: US 11,937,558 B2
(45) Date of Patent: Mar. 26, 2024

(54) IRRIGATION WATER AMOUNT MEASUREMENT APPARATUS, IRRIGATION WATER AMOUNT MEASUREMENT METHOD, AND COMPUTER-READABLE RECORDING MEDIUM

(71) Applicant: NEC Corporation, Tokyo (JP)

(72) Inventor: Kousuke Ishida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 839 days.

(21) Appl. No.: 16/981,056

(22) PCT Filed: Mar. 15, 2019

(86) PCT No.: PCT/JP2019/010973
§ 371 (c)(1),
(2) Date: Sep. 15, 2020

(87) PCT Pub. No.: WO2019/181808
PCT Pub. Date: Sep. 26, 2019

(65) Prior Publication Data
US 2021/0045300 A1    Feb. 18, 2021

(30) Foreign Application Priority Data

Mar. 22, 2018   (JP) ................... 2018-054495

(51) Int. Cl.
A01G 25/16   (2006.01)
A01C 23/04   (2006.01)
A01G 25/02   (2006.01)

(52) U.S. Cl.
CPC .......... *A01G 25/165* (2013.01); *A01C 23/042* (2013.01); *A01G 25/02* (2013.01); *A01G 25/167* (2013.01)

(58) Field of Classification Search
None
See application file for complete search history.

(56) References Cited

U.S. PATENT DOCUMENTS 5,038,268 A * 8/1991 Krause ............... G05B 19/0421
239/69
5,591,974 A * 1/1997 Troyer ............... G01N 33/0075
250/336.1

(Continued)

FOREIGN PATENT DOCUMENTS

CN    104871935 A    *    9/2015
JP    2004-124599 A         4/2004

(Continued)

OTHER PUBLICATIONS

International Search Report for PCT Application No. PCT/JP2019/010973, dated May 21, 2019.

(Continued)

*Primary Examiner* — Natalie Huls
*Assistant Examiner* — Cynthia L Davis

(57) ABSTRACT

An irrigation water amount measurement apparatus 10 includes: a sensor data obtaining unit 11 that obtains sensor data for specifying soil moisture contents of sections of an agricultural field, from moisture sensors installed in the respective sections; an irrigation water amount measurement unit 12 that measures a supply amount of irrigation water supplied from a drip irrigation system during a period from start to end of irrigation in the entire agricultural field; an irrigation time specifying unit 13 that specifies a period of time during which irrigation water was supplied to the section based on a change state of a soil moisture content of the section; and a calculation processing unit 14 that calculates a supply amount of irrigation water supplied to the section, based on a period of time specified for the section, a period from start to end of irrigation, and a measured supply amount.

6 Claims, 7 Drawing Sheets

(56) References Cited

U.S. PATENT DOCUMENTS

2011/0238226 A1* 9/2011 Schmidt .............. A01G 27/003
                                                    700/284
2012/0041606 A1   2/2012 Standerfer et al.
2013/0341420 A1* 12/2013 Lister .................. G01N 33/246
                                                    239/63

FOREIGN PATENT DOCUMENTS

| JP | 2006-345761 A | 12/2006 |
| JP | 2015-173653 A | 10/2015 |
| KR | 20140034506 A | 3/2014 |
| WO | 2012/080689 A2 | 6/2012 |

OTHER PUBLICATIONS

Extended European Search Report for EP Application No. EP19772372.9 dated Apr. 21, 2021.
English translation of Written opinion for PCT Application No. PCT/JP2019/010973, dated May 21, 2019.

* cited by examiner

Fig. 7

TYPES AND FEATURES OF IRRIGATION

| TYPES OF IRRIGATION | WATER USE EFFICIENCY (%) | RELATIVE INTRODUCTION COST | FEATURES |
|---|---|---|---|
| Border, furrow, basin (Rudimentary irrigation such as furrow irrigation) | 60% | LOW | Draw water from channels, etc., and spread water using slope of field. |
| Sprinkler irrigation | 75% | AVERAGE | There are a large number of types including barrow-type and large-scale center pivot-type, used for wheat, barley, corn, etc. |
| Drip irrigation (Tubes are installed on surface of ground or buried in ground) | 90% | HIGH | Water drips from discharge outlets spaced at certain interval mechanism is adopted in which water exits when certain water pressure is applied to discharge outlets, and same amount of water can be given from any discharge outlets, enabling effective farming, mostly used in region where water is expensive, and for crops that require sensitive water management (e.g., tomatoes). |

IRRIGATION WATER AMOUNT MEASUREMENT APPARATUS, IRRIGATION WATER AMOUNT MEASUREMENT METHOD, AND COMPUTER-READABLE RECORDING MEDIUM

This application is a National Stage Entry of PCT/JP2019/010973 filed on Mar. 15, 2019, which claims priority from Japanese Patent Application 2018-054495 filed on Mar. 22, 2018, the contents of all of which are incorporated herein by reference, in their entirety.

TECHNICAL FIELD

The present invention relates to an irrigation water amount measurement apparatus and irrigation water amount measurement method for measuring a supply amount of irrigation water for each section of an agricultural field when drip irrigation is performed in the agricultural field, and in particular relates to a computer-readable recording medium that includes a program recorded thereon for realizing the apparatus and method.

BACKGROUND ART

Conventionally, in large-scale agricultural fields, irrigation has been performed in order to appropriately maintain the soil moisture content in the entire agricultural fields. Furrow irrigation, sprinkler irrigation, and drip irrigation as shown in FIG. 7 are known as examples of a main irrigation method. FIG. 7 is an explanatory diagram for explaining conventional irrigation methods. FIG. 7 shows features of the irrigation methods.

From among these, the furrow irrigation is rudimentary irrigation, and is not suitable for a large-scale agricultural field in terms of the use efficiency of irrigation water. On the other hand, sprinkler irrigation refers to a method for scattering irrigation water using a sprinkler, and is suitable for a large-scale agricultural field. In addition, with sprinkler irrigation, the equipment cost can be reduced in a large amount, compared with drip irrigation to be described later.

On the other hand, drip irrigation refers to a method in which drip tubes for irrigation are laid in an agricultural field, and irrigation water is supplied and dripped from drippers provided on the drip tubes, to agricultural crops. Commonly, in cultivation of agricultural crops, it is important to supply appropriate amounts of water and fertilizer in accordance with a growth stage. The importance is significant for vegetables such as tomatoes for which more delicate water and fertilizer management is required. Also, in drip irrigation, irrigation can be performed at the bases of crops in a pinpoint manner, and thus more delicate water management is enabled. Moreover, in drip irrigation, water with fertilizer mixed therein can also be used as irrigation water, and, in this case, delicate fertilizer management is also enabled. Therefore, drip irrigation is suitable for crops such as tomatoes for which delicate water and fertilizer management is required.

The equipment cost for drip irrigation is high, but an appropriate amount of water can be efficiently supplied to agricultural crops in this manner. Therefore, in drip irrigation, it is possible to reliably supply water to agricultural crops, compared with sprinkler irrigation, and it is possible to reduce the use amount of water in a large amount. Therefore, when agricultural crops, for which there is demand for strict management of a soil moisture content, are cultivated, drip irrigation is mainly adopted.

Incidentally, in an actual agricultural field in which drip irrigation is adopted, the amount of irrigation water that is supplied is manually managed in most cases. Specifically, a worker opens a supply valve at a start time and closes the supply valve at an end time in accordance with a plan made by a manager. The flow amount of irrigation water that is discharged from the supply valve is constant, and thus the amount of irrigation water that is supplied is managed by appropriately setting the start time and the end time.

However, in actuality, there are cases where times when a worker opens and closes a valve are respectively different from a start time and an end time that have been set in a plan. There is also the possibility that the degree of this difference will change depending on a worker. As a result, it may be difficult to strictly manage the amount of irrigation water that is supplied.

In view of this, Patent Document 1 discloses a system that mechanically controls a supply amount of irrigation water in irrigation. Specifically, the system disclosed in Patent Document 1 manages a supply amount of irrigation water by opening a valve if it is determined that the amount of moisture in soil reaches a lower limit, and closing the valve if it is determined that the moisture content reaches an upper limit, based on data output from a sensor and estimated data of climate and moisture in soil.

LIST OF RELATED ART DOCUMENTS

Patent Document

Patent Document 1: Japanese Patent Application No. 2004-124599

SUMMARY OF INVENTION

Problems to be Solved by the Invention

Incidentally, usually, if drip irrigation is adopted, an agricultural field is divided into several sections, and supply lines that include drip tubes are constructed for the respective sections. Supply valves are installed between a water source and the respective supply lines, and a worker opens/closes the supply valves according to an established plan, for the respective supply lines.

Accordingly, in drip irrigation, a moisture content in soil differs for each of the sections, and is not uniform. Therefore, the system disclosed in Patent Document 1 is not based on the assumption that a moisture content is measured for each section, and thus, if this system is applied to drip irrigation without any change, there is the possibility that an error in the supply amount of irrigation water will be too large.

On the other hand, it is conceivable that the above problem is solved if the system disclosed in Patent Document 1 is introduced with estimation of data and control of supply valves being enabled for each section, but, in this case, the equipment cost will be very high.

An example object of the invention is to provide an irrigation water amount measurement apparatus, an irrigation water amount measurement method, and a computer-readable recording medium that solve the foregoing problem, and that can enable strict management of the amount of irrigation water that is supplied to an agricultural field in which drip irrigation is adopted, while suppressing an increase in the equipment cost.

Means for Solving the Problems

In order to achieve the foregoing object, an irrigation water amount measurement apparatus according to an example aspect of the invention is an apparatus for measuring a supply amount of irrigation water in an agricultural field in which a drip irrigation system is installed, the apparatus including:

a sensor data obtaining unit configured to obtain sensor data for specifying soil moisture contents in respective sections resulting from dividing the agricultural field into a plurality of pieces, from moisture sensors installed in the respective sections;

an irrigation water amount measurement unit configured to measure a supply amount of irrigation water supplied from the drip irrigation system, in the entire agricultural field, during a period from start to end of irrigation;

an irrigation time specifying unit configured to specify, for each of the sections, a period of time during which irrigation water was supplied to the section, based on a change state of a soil moisture content of the section specified by the sensor data; and a calculation processing unit configured to calculate, for each of the sections, a supply amount of irrigation water supplied to the section, based on a period of time specified for the section, the period from start to end of irrigation in the entire agricultural field, and the measured supply amount.

In addition, in order to achieve the foregoing object, an irrigation water amount measurement method according to an example aspect of the invention is a method for measuring a supply amount of irrigation water in an agricultural field in which a drip irrigation system is installed, the method including:

(a) a step of obtaining sensor data for specifying soil moisture contents in respective sections resulting from dividing the agricultural field into a plurality of pieces, from moisture sensors installed in the respective sections;

(b) a step of measuring a supply amount of irrigation water supplied from the drip irrigation system, in the entire agricultural field, during a period from start to end of irrigation;

(c) a step of specifying, for each of the sections, a period of time during which irrigation water was supplied to the section, based on a change state of a soil moisture content of the section specified by the sensor data; and (d) a step of calculating, for each of the sections, a supply amount of irrigation water supplied to the section, based on a period of time specified for the section, the period from start to end of irrigation in the entire agricultural field, and the measured supply amount.

Furthermore, in order to achieve the foregoing object, a computer-readable recording medium according to an example aspect of the invention includes a program recorded thereon for a computer to measure a supply amount of irrigation water in an agricultural field in which a drip irrigation system is installed, the program including instructions that cause a computer to carry out:

(a) a step of obtaining sensor data for specifying soil moisture contents in respective sections resulting from dividing the agricultural field into a plurality of pieces, from moisture sensors installed in the respective sections;

(b) a step of measuring a supply amount of irrigation water supplied from the drip irrigation system, in the entire agricultural field, during a period from start to end of irrigation;

(c) a step of specifying, for each of the sections, a period of time during which irrigation water was supplied to the section, based on a change state of a soil moisture content of the section specified by the sensor data; and (d) a step of calculating, for each of the sections, a supply amount of irrigation water supplied to the section, based on a period of time specified for the section, the period from start to end of irrigation in the entire agricultural field, and the measured supply amount.

Advantageous Effects of the Invention

As described above, according to the invention, it is possible to perform strict management of the amount of irrigation water that is supplied to an agricultural field in which a drip irrigation is adopted.

BRIEF DESCRIPTION OF THE DRAWINGS

FIG. 3A shows a case of a section A, and FIG. 3B shows a case of a section B.

FIG. 7 is an explanatory diagram for explaining conventional irrigation methods.

EXAMPLE EMBODIMENTS

Example Embodiment

An irrigation water amount measurement apparatus, an irrigation water amount measurement method, and a program according to an example embodiment of the invention will be described below with reference to FIGS. 1 to 6.

[Apparatus Configuration]

Figure 1:
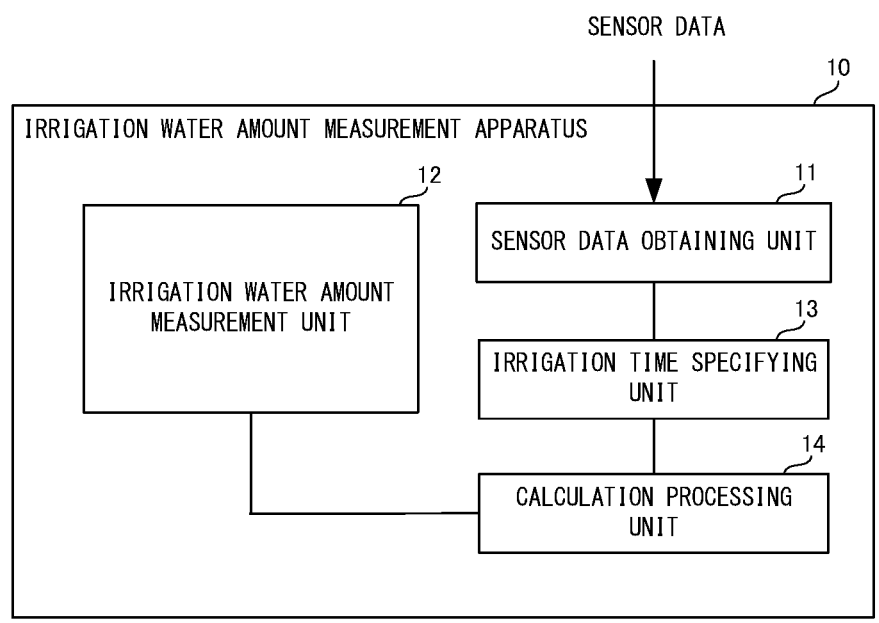
FIG. 1 is a configuration diagram showing the configuration of an irrigation water amount measurement apparatus according to an example embodiment of the invention.

First, the configuration of the irrigation water amount measurement apparatus according to the example embodiment will be described with reference to FIG. 1. FIG. 1 is a configuration diagram showing the configuration of the irrigation water amount measurement apparatus according to the example embodiment of the invention.

An irrigation water amount measurement apparatus 10 according to the example embodiment shown in FIG. 1 is an apparatus for measuring a supply amount of irrigation water, in an agricultural field in which a drip irrigation system is installed. As shown in FIG. 1, the irrigation water amount measurement apparatus 10 includes a sensor data obtaining unit 11, an irrigation water amount measurement unit 12, an irrigation time specifying unit 13, and a calculation processing unit 14.

The sensor data obtaining unit 11 obtains sensor data for specifying soil moisture contents in respective sections resulting from dividing the agricultural field into a plurality of pieces, from moisture sensors installed in the respective sections. The irrigation water amount measurement unit 12 measures a supply amount of irrigation water supplied from a drip irrigation system 20 (hereinafter, referred to as a "total irrigation water amount"), in the entire agricultural field, during a period from start to end of irrigation.

The irrigation time specifying unit 13 specifies, for each of the sections, a period of time during which irrigation water was supplied to the section, based on a change state of the soil moisture content of the section specified by the sensor data. The calculation processing unit 14 calculates, for each of the sections, a supply amount of irrigation water supplied to the section, based on the total irrigation water amount and the period of time specified for the section.

As described above, according to the example embodiment, a supply amount of irrigation water is calculated for each section, based on the feature, in the drip irrigation system, of supplying irrigation water to each section. Therefore, according to the example embodiment, it is possible to strictly manage the amount of irrigation water that is supplied to an agricultural field in which drip irrigation is adopted. Also, according to the example embodiment, it is not necessary to automatically control a valve for each section, and thus an increase in the equipment cost is suppressed. Furthermore, the example embodiment can be applied to an existing drip irrigation system without any change, and thus an increase in the equipment cost is suppressed in this regard as well.

Figure 2:
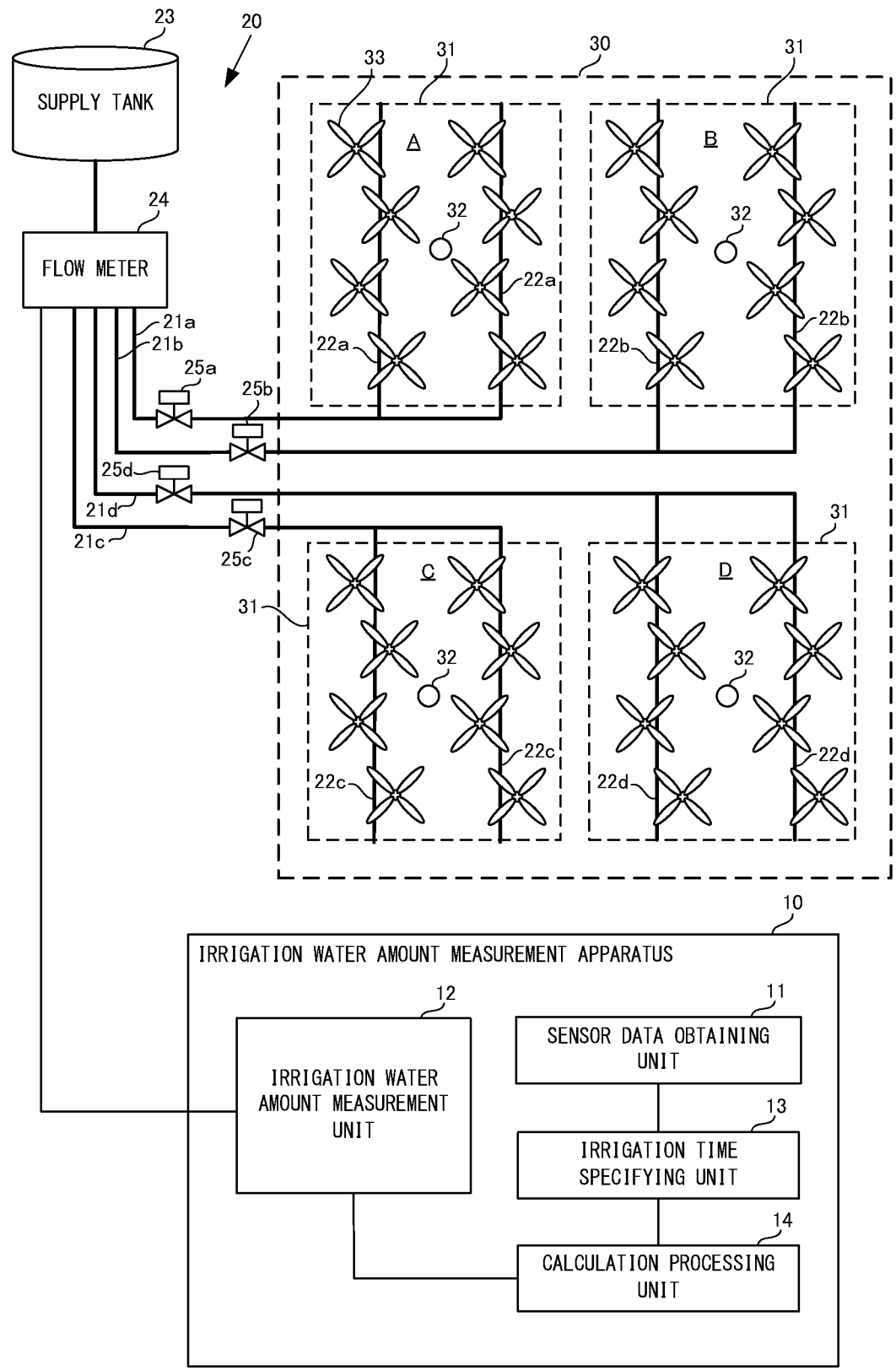
FIG. 2 is a configuration diagram showing an example where an irrigation water amount measurement apparatus according to an example embodiment of the invention is applied to an irrigation system.

Next, functions of the irrigation water amount measurement apparatus according to the example embodiment will be described in detail with reference to FIG. 2. FIG. 2 is a configuration diagram showing an example where an irrigation water amount measurement apparatus according to an example embodiment of the invention is applied to an irrigation system.

FIG. 2 shows the drip irrigation system 20 and an agricultural field 30 to which the irrigation water amount measurement apparatus 10 according to the example embodiment is applied. As shown in FIG. 2, a plurality of ridges are provided in the agricultural field 30, and crops 33 are planted along such ridges. Also, in the example in FIG. 2, the agricultural field 30 is divided into four sections 31 along the ridges. Reference numerals A to D in FIG. 2 denote identifiers assigned to the respective sections 31 to facilitate description.

As shown in FIG. 2, the drip irrigation system 20 includes supply lines 21a to 21d provided for the respective sections, drip lines 22a to 22d that branch from the respective supply lines, valves 25a to 25d provided for the respective supply lines, a flow meter 24, and a supply tank 23.

The supply lines 21a to 21d are lines for guiding irrigation water of the supply tank 23, which is a water source, to corresponding sections. When one of the valves corresponding to the supply lines 21a to 21d is opened, irrigation water of the supply tank 23 is guided to the corresponding section 31 via the supply line.

In addition, in the drip irrigation system 20 shown in FIG. 2, the valves 25a to 25d are opened/closed by a worker sequentially. Specifically, the worker opens, for example, the valve 25a, 25b, 25c, and 25d in the stated order, each for a certain period of time, in accordance with a plan established in advance, and supplies irrigation water to the sections. Note that, in the drip irrigation system 20, only one valve is set to an open state, and, after the valve in the open state is closed, another valve is opened.

The flow meter 24 measures a supply amount of irrigation water supplied from the supply tank 23 to the agricultural field 30 via one of the supply lines. In addition, in the example in FIG. 2, the flow meter 24 is a pulse-transmitting flow meter, and outputs a pulse signal every time a set amount of fluid flows. According to the example embodiment, an output pulse signal is sent to the irrigation water amount measurement apparatus 10. Note that, according to the example embodiment, the flow meter 24 is not limited to the pulse-transmitting type. A case will be described later in which a flow meter 21 of another type is used.

The drip lines 22a to 22d are lines that respectively branch from the corresponding supply lines, and are each made of a general agricultural drip tube. Also, the drip lines 22a to 22d are respectively arranged along ridges of the corresponding sections. In the example in FIG. 2, the drip line 22a branches from the supply line 21a, the drip line 22b branches from the supply line 21b, the drip line 22c branches from the supply line 21c, and the drip line 22d branches from the supply line 21d.

In addition, as described above, the drip lines 22a to 22d are each made of a drip tube, and thus drippers (not illustrated in FIG. 2) are provided at a certain interval in the longitudinal direction on the tube wall of each of the drip lines. The drippers are configured to be capable of irrigating a certain amount of irrigation water as in a drip, and supply an optimum amount of irrigation water to the crops 33.

With such a configuration, the drip irrigation system 20 enables pinpoint irrigation at the roots of the crops 33, and thus more delicate water management can be performed. Also, in drip irrigation, fertilizer is supplied in a state of being mixed with water, and thus delicate fertilizer management is also enabled.

Moisture sensors 32 are installed in the respective sections 31. Also, each of the moisture sensors 32 transmits sensor data for specifying a soil moisture content of the section in which that moisture sensor 32 is installed, to the irrigation water amount measurement apparatus 10 at a certain interval. The moisture sensor 32 outputs an analog signal as sensor data, but, according to the example embodiment, includes a digital/analog conversion circuit, and converts sensor data into a digital signal, and then transmits the digital signal to the irrigation water amount measurement apparatus 10. In addition, in the example in FIG. 2, the moisture sensors 32 convert sensor data into a digital signal, and transmit the digital signal to the irrigation water amount measurement apparatus 10 through wireless communication. Sensor data may also be transmitted in a wired manner.

When sensor data is transmitted, the sensor data obtaining unit 11 obtains the sensor data. In addition, according to the example embodiment, the sensor data obtaining unit 11 specifies, based on the sensor data, a soil moisture content in the section in which the moisture sensor 32 that transmitted the sensor data is arranged, and outputs the specified soil moisture content to the irrigation time specifying unit 13.

According to the example embodiment, the irrigation water amount measurement unit 12 obtains a pulse signal output by the flow meter 24, and measures a total irrigation water amount based on the number of times a pulse signal was obtained. Specifically, the irrigation water amount measurement unit 12 measures a total irrigation water amount by multiplying a preset flow amount per pulse by the number of times a pulse signal was obtained.

The irrigation time specifying unit 13 first specifies, for each section, a time when a soil moisture content of the section started to rise and a time when a soil moisture content in another section started to rise. The irrigation time specifying unit 13 then specifies a period from the former specified time until the latter specified time, as a period during which irrigation water was supplied to that section (hereinafter, referred to as an "irrigation implementation period").

Figure 3A:
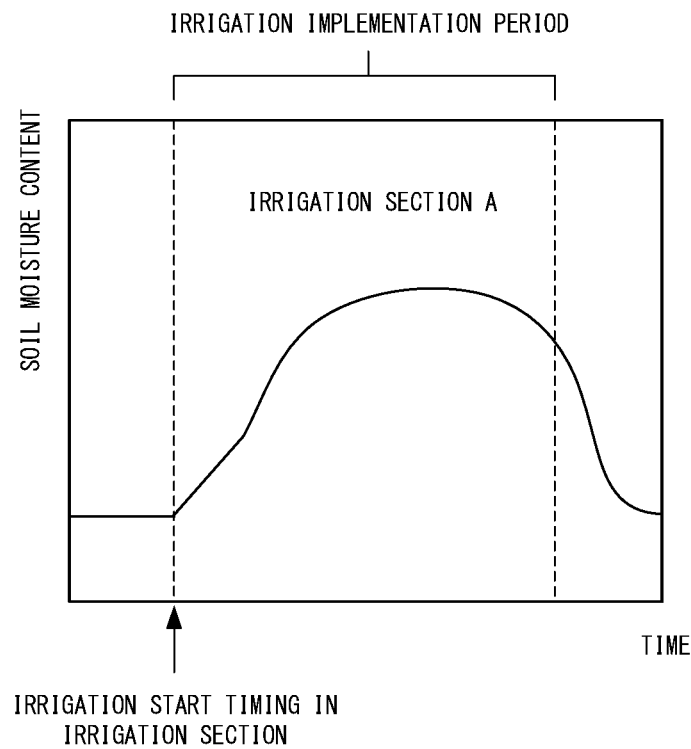
FIGS. 3A and 3B are a diagram showing a soil moisture content measured according to an example embodiment of the invention.
Figure 3B:
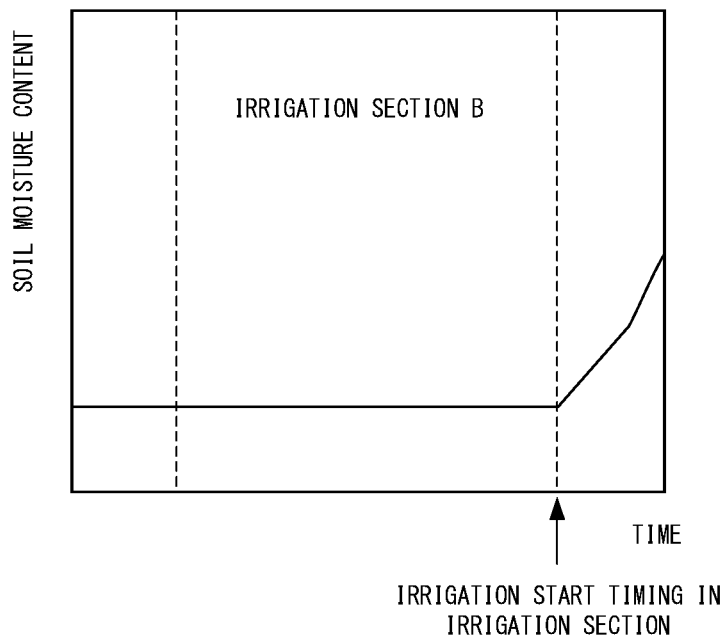

Here, the functions of the irrigation time specifying unit 13 will be described in more detail with reference to FIGS. 3A and 3B. FIGS. 3A and 3B are a diagram showing a soil moisture content measured according to the example embodiment of the invention, and FIG. 3A shows a case of the section A, and FIG. 3B shows a case of the section B.

First, as shown in FIG. 2, the section A and the section B are adjacent to each other, but the drip lines of the respective sections are respectively connected to the separate supply lines. Assume that, in the examples in FIGS. 3A and 3B, supply to the section A is performed, and supply to the section B is then performed. In other words, assume that a worker opens the valve 25a for a predetermined period of time, then closes the value, and then opens the valve 25b.

In this case, as shown in FIGS. 3A and 3B, when the valve 25a is opened, the soil moisture content rises in the section A, and, after that, when the valve 25a is closed, the soil moisture content gradually lowers. Also, when the valve 25b is opened, the soil moisture content rises in the section B.

At this time, the irrigation time specifying unit 13 specifies, as an irrigation implementation period in the section A, a period from when the soil moisture content in the section A started to rise until when the soil moisture content in the section B started to rise. The irrigation time specifying unit 13 also calculates irrigation implementation periods of the sections B to D similarly. In addition, the irrigation time specifying unit 13 can define a time when a valve corresponding to a section where irrigation water is lastly supplied was closed, as an end time of the irrigation implementation period.

In addition, according to the example embodiment, the calculation processing unit 14 calculates a supply amount per unit time by first dividing the total irrigation water amount measured by the irrigation water amount measurement unit 12, by a period during which irrigation water was supplied through irrigation, in other words the total of periods during which the valves 25a to 25d were respectively open (from opening until closing). The calculation processing unit 14 then calculates, for each section, a supply amount of irrigation water supplied to the section using Expression 1 below.

Supply amount of irrigation water supplied to specific section=Irrigation implementation period of specific section×Supply amount per unit time   Expression 1

In addition, according to the example embodiment, assume that times when a worker or the manager of the drip irrigation system 20 opened and closed each of the valves 25a to 25d are directly input to the irrigation water amount measurement apparatus 10. In this case, the calculation processing unit 14 calculates, based on the input times, a period during which irrigation water was supplied through irrigation. Furthermore, when a signal indicating open/close of a valve is transmitted from each of the valves 25a to 25d to the irrigation water amount measurement apparatus 10, the calculation processing unit 14 specifies, based on this signal, times when each of the valves 25a to 25d was opened and closed, and calculates a period during which irrigation water was supplied through irrigation.

[Apparatus Operations]

Figure 4:
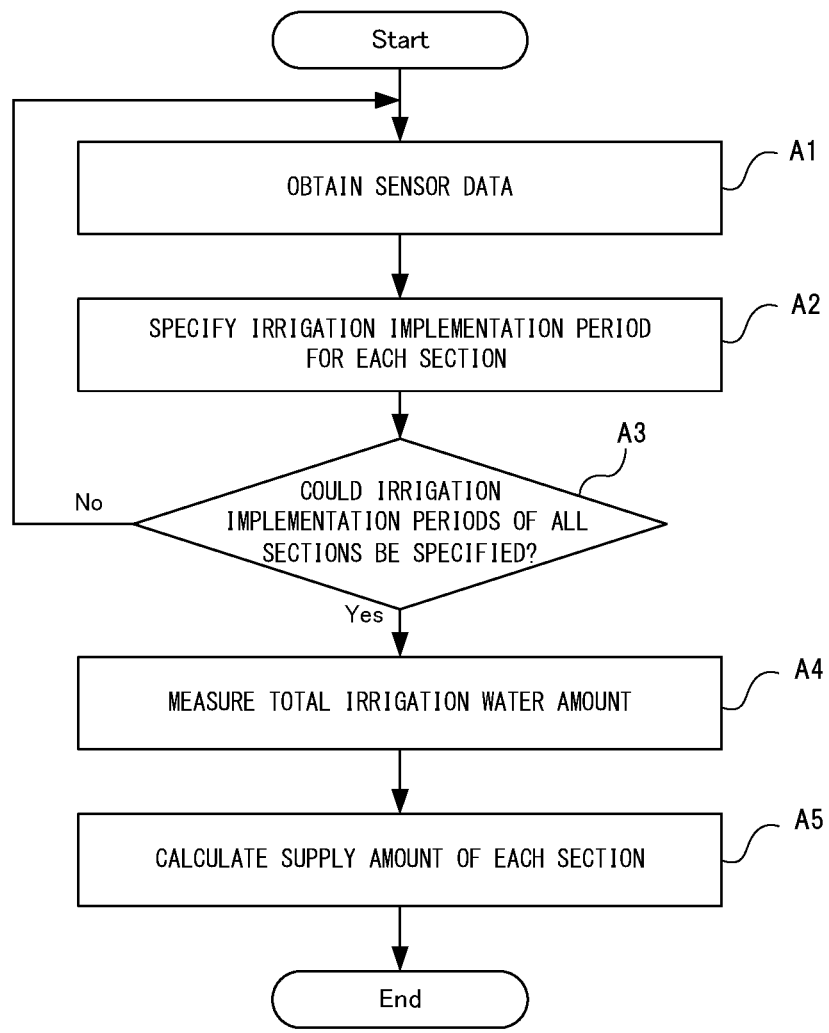
FIG. 4 is a flowchart showing operations of an irrigation water amount measurement apparatus according to an example embodiment of the invention.

Next, operations of the irrigation water amount measurement apparatus 10 according to the example embodiment will be described with reference to FIG. 4. FIG. 4 is a flowchart showing operations of the irrigation water amount measurement apparatus according to an example embodiment of the invention. In the following description, FIGS. 1 to 3 will be referred to as appropriate. In addition, according to the example embodiment, the irrigation water amount measurement method is implemented by causing the irrigation water amount measurement apparatus 10 to operate. Thus, a description of the irrigation water amount measurement method according to the example embodiment is replaced with the following description of operations of the irrigation water amount measurement apparatus 10.

As shown in FIG. 4, first, the sensor data obtaining unit 11 obtains sensor data transmitted from the moisture sensors 32 arranged in the respective sections 31 (step A1). Also, in step A1, the sensor data obtaining unit 11 specifies, based on the obtained sensor data, soil moisture contents of the respective sections where the moisture sensors 32 that transmitted the sensor data are arranged respectively.

Next, the irrigation time specifying unit 13 specifies irrigation implementation periods of the respective sections based on the change states of the soil moisture contents specified by the sensor data in step A1 (step A2).

Specifically, in step A2, as shown in FIGS. 3 (*a*) and 3 (*b*), a period from when a soil moisture content started to rise in a specific section 31 until when a soil moisture content started to rise in another section 31 is specified, and that period is defined as an irrigation implementation period of the specific section 31.

Next, the irrigation time specifying unit 13 determines whether or not irrigation implementation periods could be specified for all of the sections 31 (step A3). As a result of the determination in step A3, if irrigation implementation periods could not be specified for all of the sections 31, the irrigation time specifying unit 13 causes the sensor data obtaining unit 11 to execute step A1 again.

On the other hand, as a result of the determination in step A3, if irrigation implementation periods could be specified for all of the sections 31, the irrigation time specifying unit 13 notifies the irrigation water amount measurement unit 12 of that result. Accordingly, the irrigation water amount measurement unit 12 measures a total irrigation water amount (step A4).

Specifically, in step A4, the irrigation water amount measurement unit 12 obtains pulse signals output by the flow meter 24 while irrigation is performed, and measures the number of times a pulse signal was obtained. Accordingly, the irrigation water amount measurement unit 12 measures a total irrigation water amount by multiplying the number of times by a preset flow amount per pulse.

Next, the calculation processing unit 14 calculates supply amounts of irrigation water supplied to the respective sections, based on the irrigation implementation periods specified in step A2, the period from start to end of irrigation in the entire agricultural field, and the total irrigation water amount measured in step A4 (step A5).

Specifically, in step A5, the calculation processing unit 14 calculates a supply amount per unit time by first dividing the total irrigation water amount measured in step A4, by the total of periods during which the valves 25a to 25d were respectively open (from opening until closing). The calculation processing unit 14 then calculates, for each of the sections, a supply amount of irrigation water supplied to the section using Expression 1 above.

After executing step A5, the irrigation water amount measurement apparatus 10 can transmit data for specifying the calculated supply amount of irrigation water of each section, to a terminal apparatus or the like of the manager of the drip irrigation system 20. In this case, the manager can confirm an accurate supply amount of irrigation water of each section, on the terminal apparatus or the like, and can strictly manage a supply amount of irrigation water.

Effects of Example Embodiment

As described above, according to the example embodiment, the amount of supplied irrigation water can be accurately measured for each section using the feature of the drip irrigation system. According to the example embodiment, it is possible to strictly manage a supply amount of irrigation water that is supplied to an agricultural field in which drip irrigation is adopted. In addition, according to the example embodiment, an existing drip irrigation system can be used without any change, and an increase in the equipment cost is suppressed.

Modified Example 1

Figure 5:
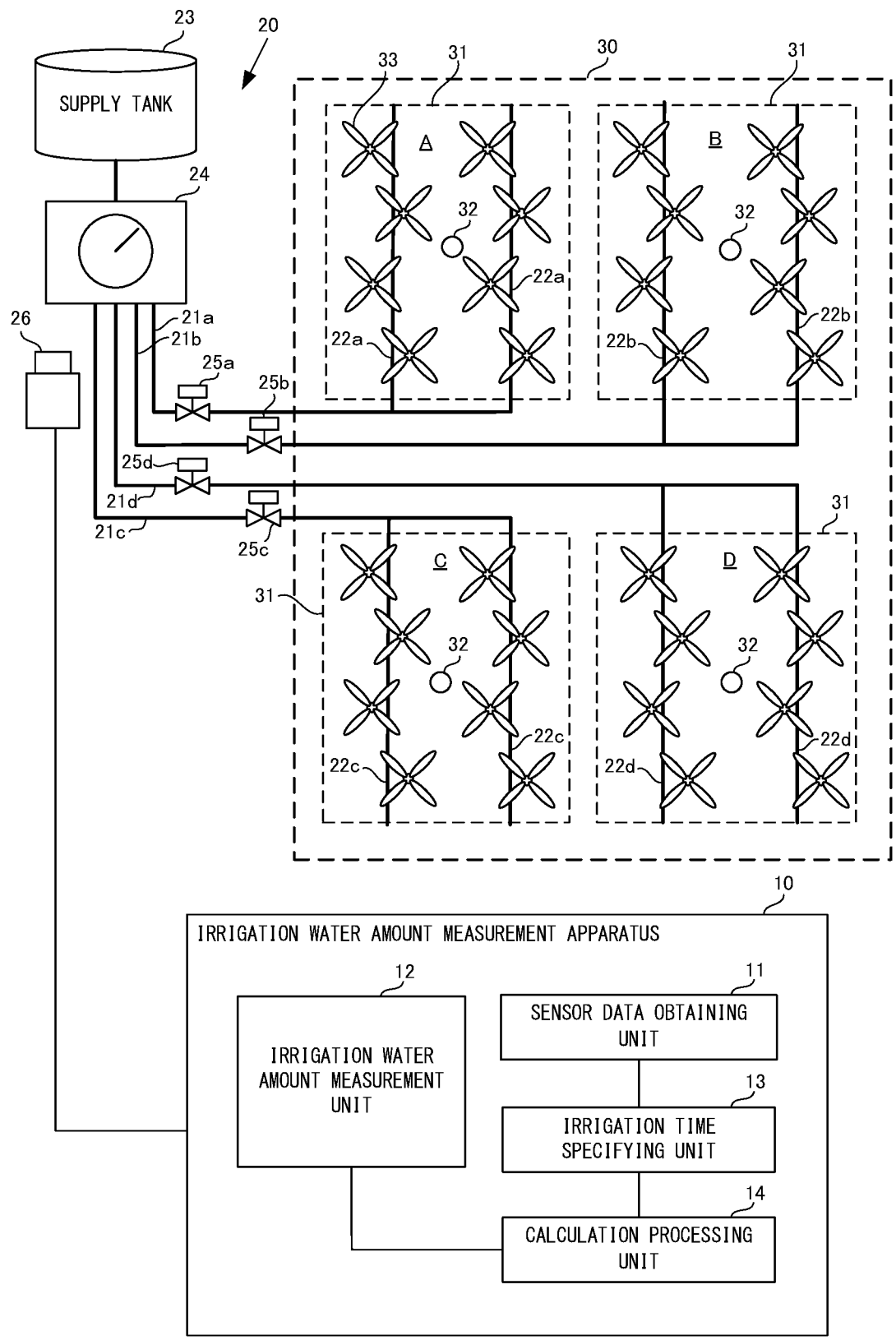
FIG. 5 is a configuration diagram showing the configuration of an irrigation water amount measurement apparatus according to Modified Example 1 of an example embodiment of the invention.

Next, Modified Example 1 of the irrigation water amount measurement apparatus 10 according to the example embodiment will be described with reference to FIG. 5. FIG. 5 is a configuration diagram showing an irrigation water amount measurement apparatus according to Modified Example 1 of the example embodiment of the invention.

In this Modified Example 1, the flow meter 24 is a type of flow meter that displays, through meter display, a flow amount of irrigation water that has passed through the flow meter. In addition, a digital camera 26 is arranged near the flow meter 24 such that the meter portion can be shot. The digital camera 26 performs shooting at a set interval, and transmits image data obtained through shooting to the irrigation water amount measurement apparatus 10 in time series. Note that shooting that is performed by the digital camera 26 at the set interval may be performed by the manager, or may also be automatically performed.

Therefore, according to this Modified Example 1, the irrigation water amount measurement unit 12 obtains image data of the flow meter 24 from the digital camera 26 in time series, and measures a total irrigation water amount based on the obtained image data.

Specifically, for example, if the flow meter 24 is an analog meter, the irrigation water amount measurement unit 12 extracts a needle portion on the meter from image data through image processing, and specifies, from the extracted needle portion, the flow amount of irrigation water that has passed through the flow meter 24. Also, if the flow meter 24 is a digital meter that displays a numerical value, the irrigation water amount measurement unit 12 extracts a number portion through image processing, and specifies, from the extracted number portion, the flow amount of irrigation water that has passed through the flow meter 24. The irrigation water amount measurement unit 12 then calculates a total irrigation water amount based on the specified flow amount.

Modified Example 2

Next, Modified Example 2 will be described. According to the above-described example embodiment, a case has been described in which irrigation water is supplied through drip irrigation, but, according to this Modified Example 2, irrigation is performed using irrigation water with fertilizer mixed therein. Accordingly, an irrigation water amount measurement apparatus in this Modified Example 2 can be applied when the drip irrigation system 20 supplies, to the agricultural field 30, irrigation water with fertilizer mixed therein at a specific mixing rate.

Specifically, according to this Modified Example 2, the calculation processing unit 14 calculates not only a supply amount of irrigation water for each section, but also a supply amount of fertilizer for each section. Letting the mixing rate of fertilizer to water be a, the calculation processing unit 14 calculates, for each section, a supply amount of fertilizer supplied to the section using Expression 2 below.

Supply amount of fertilizer supplied to specific section=Irrigation implementation period of specific section×Supply amount per unit time×mixing rate α of fertilizer to water      Expression 2

According to this Modified Example 2, it is also possible to strictly perform fertilizer management in drip irrigation. This Modified Example 2 is also useful for crops for which fertilizer management is important. In addition, in Modified Example 2, fertilizer is dissolved in irrigation water, and thus, instead of the moisture sensors 32, an EC sensor that can detect fertilizer in soil may also be used as the sensor.

[Program]

The program according to the example embodiment need only be a program that causes a computer to execute steps A1 to A5 shown in FIG. 4. The irrigation water amount measurement apparatus 10 and the irrigation water amount measurement method according to the example embodiment can be realized, by this program being installed on a computer and executed. In this case, the processor of the computer performs processing, while functioning as the sensor data obtaining unit 11, the irrigation water amount measurement unit 12, the irrigation time specifying unit 13, and the calculation processing unit 14.

Also, the program according to the example embodiment may be executed by a computer system constituted by a plurality of computers. In this case, for example, each of the computers may function as one of the sensor data obtaining unit 11, the irrigation water amount measurement unit 12, the irrigation time specifying unit 13, and the calculation processing unit 14.

[Physical Configuration]

Figure 6:
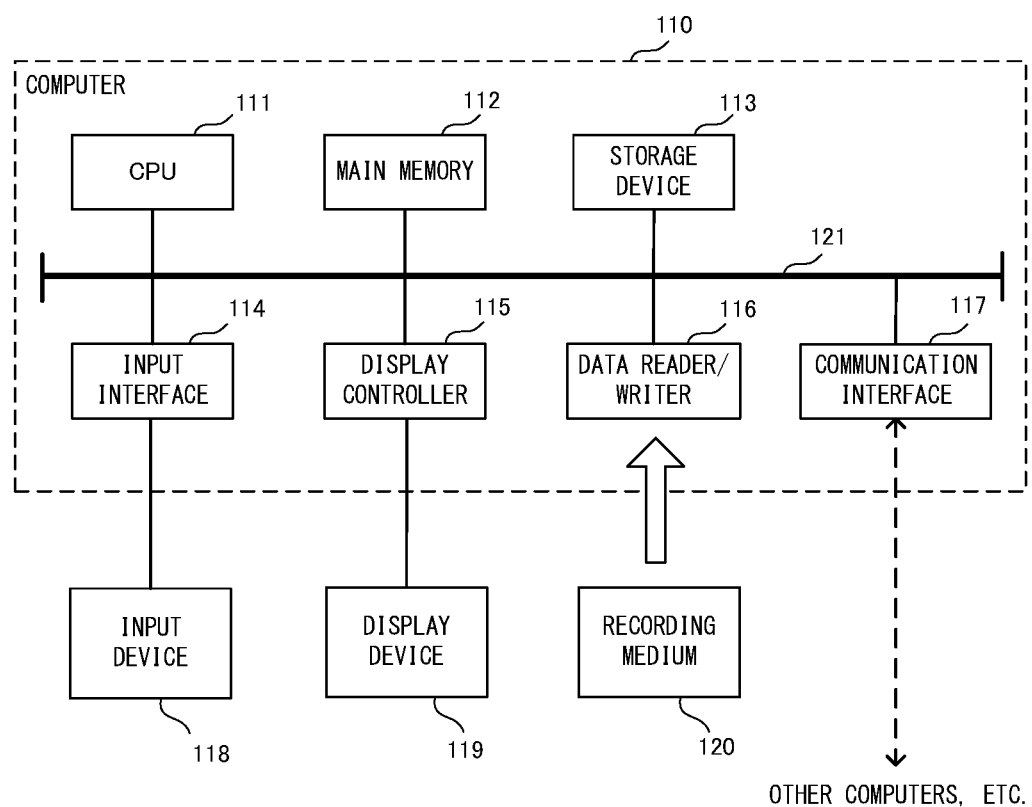
FIG. 6 is a block diagram showing an example of a computer that realizes an irrigation water amount measurement apparatus according to an example embodiment of the invention.

Here, a computer that realizes an irrigation water amount measurement apparatus by executing the program according to the example embodiment will be described with reference to FIG. 6. FIG. 6 is a block diagram showing an example of a computer that realizes an irrigation water amount measurement apparatus according to example embodiment of the invention.

As shown in FIG. 6, a computer 110 includes a CPU 111, a main memory 112, a storage device 113, an input interface 114, a display controller 115, a data reader/writer 116, and a communication interface 117. These units are connected in a manner that enables data communication therebetween, via a bus 121. Note that the computer 110 may also include a GPU (Graphics Processing Unit) or an FPGA (Field-Programmable Gate Array) in addition to or instead of the CPU 111.

The CPU 111 implements various computational operations, by deploying, to the main memory 112, program (codes) according to the example embodiment that are stored in the storage device 113, and executing these codes in predetermined order. The main memory 112, typically, is a volatile storage device such as a DRAM (Dynamic Random Access Memory). Also, programs according to the example embodiment are provided in a state of being stored on a computer-readable recording medium 120. Note that programs according to the example embodiment may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to a display device 119, and controls display by the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic recording medium such as a flexible disk, and an optical recording medium such as a CD-ROM (Compact Disk Read Only Memory) are given as specific examples of the recording medium 120.

Note that the irrigation water amount measurement apparatus 10 according to the example embodiment is also realizable by using hardware corresponding to the respective units, rather than by a computer on which programs are installed. Furthermore, the irrigation water amount measurement apparatus 10 may be realized in part by programs, and the remaining portion may be realized by hardware.

The example embodiment described above can be partially or wholly realized by supplementary notes 1 to 15 described below, but the invention is not limited to the following description.

(Supplementary Note 1)

An irrigation water amount measurement apparatus for measuring a supply amount of irrigation water in an agricultural field in which a drip irrigation system is installed, the apparatus comprising:

a sensor data obtaining unit configured to obtain sensor data for specifying soil moisture contents in respective sections resulting from dividing the agricultural field into a plurality of pieces, from moisture sensors installed in the respective sections;

an irrigation water amount measurement unit configured to measure a supply amount of irrigation water supplied from the drip irrigation system, in the entire agricultural field, during a period from start to end of irrigation;

an irrigation time specifying unit configured to specify, for each of the sections, a period of time during which irrigation water was supplied to the section, based on a change state of a soil moisture content of the section specified by the sensor data; and a calculation processing unit configured to calculate, for each of the sections, a supply amount of irrigation water supplied to the section, based on a period of time specified for the section, the period from start to end of irrigation in the entire agricultural field, and the measured supply amount.

(Supplementary Note 2)

The irrigation water amount measurement apparatus according to Supplementary Note 1, wherein the irrigation time specifying unit specifies, as a period of time during which irrigation water was supplied to the section, a period from a time when the soil moisture content started to rise in the section until a time when a moisture content started to rise in a section other than the section.

(Supplementary Note 3)

The irrigation water amount measurement apparatus according to Supplementary Note 1 or 2, wherein, if a pulse-transmitting flow meter that outputs a pulse signal every time a set amount of fluid flows is installed downstream of a water source of the drip irrigation system, the irrigation water amount measurement unit obtains the pulse signal, and measures the supply amount based on the number of times the pulse signal was obtained.

(Supplementary Note 4)

The irrigation water amount measurement apparatus according to Supplementary Note 1 or 2, wherein the irrigation water amount measurement unit obtains image data of the flow meter installed downstream of the water source of the drip irrigation system in time series, and measures the supply amount based on the obtained image data.

(Supplementary Note 5)

The irrigation water amount measurement apparatus according to any one of Supplementary Notes 1 to 4, wherein, when the drip irrigation system supplies irrigation water with fertilizer mixed therein at a specific mixing rate, to the agricultural field, the calculation processing unit further calculates a supply amount of the fertilizer supplied to each of the sections, using the mixing rate of the fertilizer.

(Supplementary Note 6)

An irrigation water amount measurement method for measuring a supply amount of irrigation water in an agricultural field in which a drip irrigation system is installed, the method including:

(a) a step of obtaining sensor data for specifying soil moisture contents in respective sections resulting from dividing the agricultural field into a plurality of pieces, from moisture sensors installed in the respective sections;

(b) a step of measuring a supply amount of irrigation water supplied from the drip irrigation system, in the entire agricultural field, during a period from start to end of irrigation;

(c) a step of specifying, for each of the sections, a period of time during which irrigation water was supplied to the section, based on a change state of a soil moisture content of the section specified by the sensor data; and (d) a step of calculating, for each of the sections, a supply amount of irrigation water supplied to the section, based on a period of time specified for the section, the period from start to end of irrigation in the entire agricultural field, and the measured supply amount.

(Supplementary Note 7)

The irrigation water amount measurement method according to Supplementary Note 6, wherein, in the (c) step, a period from a time when the soil moisture content started to rise in the section until a time when a moisture content started to rise in a section other than the section is specified as a period of time during which irrigation water was supplied to the section.

(Supplementary Note 8)

The irrigation water amount measurement method according to Supplementary Note 6 or 7, wherein, if a pulse-transmitting flow meter that outputs a pulse signal every time a set amount of fluid flows is installed downstream of a water source of the drip irrigation system, in the (b) step, the pulse signal is obtained, and the supply amount is measured based on the number of times the pulse signal was obtained.

(Supplementary Note 9)

The irrigation water amount measurement method according to Supplementary Note 6 or 7, wherein, in the (b) step, image data of the flow meter installed downstream of the water source of the drip irrigation system is obtained in time series, and the supply amount is measured based on the obtained image data.

(Supplementary Note 10)

The irrigation water amount measurement method according to any one of Supplementary Notes 6 to 9, wherein, when the drip irrigation system supplies irrigation water with fertilizer mixed therein at a specific mixing rate, to the agricultural field, in the (d) step, a supply amount of the fertilizer supplied to each of the sections is further calculated using the mixing rate of the fertilizer.

(Supplementary Note 11)

A computer-readable recording medium that includes a program recorded thereon for a computer to measure a supply amount of irrigation water in an agricultural field in which a drip irrigation system is installed, the program including instructions that cause a computer to carry out:

(a) a step of obtaining sensor data for specifying soil moisture contents in respective sections resulting from dividing the agricultural field into a plurality of pieces, from moisture sensors installed in the respective sections;

(b) a step of measuring a supply amount of irrigation water supplied from the drip irrigation system, in the entire agricultural field, during a period from start to end of irrigation;

(c) a step of specifying, for each of the sections, a period of time during which irrigation water was supplied to the section, based on a change state of a soil moisture content of the section specified by the sensor data; and (d) a step of calculating, for each of the sections, a supply amount of irrigation water supplied to the section, based on a period of time specified for the section, the period from start to end of irrigation in the entire agricultural field, and the measured supply amount.

(Supplementary Note 12)

The computer-readable recording medium according to Supplementary Note 11, wherein, in the (c) step, a period from a time when the soil moisture content started to rise in the section until a time when a moisture content started to rise in a section other than the section is specified as a period of time during which irrigation water was supplied to the section.

(Supplementary Note 13)

The computer-readable recording medium according to Supplementary Note 11 or 12, wherein, if a pulse-transmitting flow meter that outputs a pulse signal every time a set amount of fluid flows is installed downstream of a water source of the drip irrigation system, in the (b) step, the pulse signal is obtained, and the supply amount is measured based on the number of times the pulse signal was obtained.

(Supplementary Note 14)

The computer-readable recording medium according to Supplementary Note 11 or 12, wherein, in the (b) step, image data of the flow meter installed downstream of the water source of the drip irrigation system is obtained in time series, and the supply amount is measured based on the obtained image data.

(Supplementary Note 15)

The computer-readable recording medium according to any one of Supplementary Notes 11 to 14, wherein, when the drip irrigation system supplies irrigation water with fertilizer mixed therein at a specific mixing rate, to the agricultural field, in the (d) step, a supply amount of the fertilizer supplied to each of the sections is further calculated using the mixing rate of the fertilizer.

Although the present invention has been described above with reference to the example embodiments above, the invention is not limited to the above example embodiments. Various modifications understandable to a person skilled in the art can be made in configurations and details of the invention, within the scope of the invention.

This application is based upon and claims the benefit of priority from Japanese Patent Application No. 2018-54495, filed Mar. 22, 2018, the disclosure of which is incorporated herein in its entirety by reference.

INDUSTRIAL APPLICABILITY

As described above, according to the invention, it is possible to strictly manage the amounts of water and fertilizer that are supplied to an agricultural field where drip irrigation is adopted. The invention is useful for various drip irrigation systems.

LIST OF REFERENCE SIGNS

10 Irrigation water amount measurement apparatus
11 Sensor data obtaining unit
12 Irrigation water amount measurement unit
13 Irrigation time specifying unit
14 Calculation processing unit
20 Drip irrigation system
21a to 21d Supply line
22a to 22d Drip line
23 Supply tank
24 Flow meter
25a to 25d Valve
30 Agricultural field
31 Section
32 Moisture sensor
33 Crop
110 Computer
111 CPU
112 Main Memory
113 Storage device
114 Input interface
115 Display controller
116 Data reader/writer
117 Communication interface
118 Input device
119 Display device
120 Recording medium
121 Bus

The invention claimed is:

1. An irrigation water amount measurement apparatus for measuring a supply amount of irrigation water in an agricultural field in which a drip irrigation system is installed, the apparatus comprising:

a processor;
a memory storing instructions executable by the processor to:
obtain sensor data for specifying soil moisture contents in respective sections resulting from dividing the agricultural field into a plurality of pieces, from moisture sensors installed in the respective sections;
measure the supply amount of irrigation water supplied from the drip irrigation system, in the agricultural field, during a period from start to end of irrigation;
specify, for each of the sections, a period of time during which irrigation water was supplied to the section, based on a change state of the soil moisture content of the section specified by the sensor data; and
calculate, for each of the sections, the supply amount of irrigation water supplied to the section, based on a period of time specified for the section, the period from start to end of irrigation in the agricultural field, and the measured supply amount,
wherein, for each of the sections, the period of time during which irrigation water was supplied to the section is specified as a period from a time when the soil moisture content started to rise in the section until a time when a moisture content started to rise in a different section, and
wherein the supply amount of irrigation water is measured:
based on a number of times a pulse signal was obtained from a pulse-transmitting flow meter installed downstream of a water source of the drip irrigation system and that outputs the pulse signal every time a set amount of fluid flows, or
based on image data obtained from an imaging flow meter installed downstream of the water source of the drip irrigation system in time series.

2. The irrigation water amount measurement apparatus according to claim 1, wherein, when the drip irrigation system supplies irrigation water with fertilizer mixed therein at a specific mixing rate to the agricultural field,
a supply amount of the fertilizer supplied to each of the sections is calculated using the specific mixing rate of the fertilizer.

3. An irrigation water amount measurement method for measuring a supply amount of irrigation water in an agricultural field in which a drip irrigation system is installed, the method comprising:
obtaining, by a processor, sensor data for specifying soil moisture contents in respective sections resulting from dividing the agricultural field into a plurality of pieces, from moisture sensors installed in the respective sections;
measuring, by the processor, the supply amount of irrigation water supplied from the drip irrigation system, in the agricultural field, during a period from start to end of irrigation;
specifying, by the processor and for each of the sections, a period of time during which irrigation water was supplied to the section, based on a change state of the soil moisture content of the section specified by the sensor data; and
calculating, by the processor and for each of the sections, the supply amount of irrigation water supplied to the section, based on a period of time specified for the section, the period from start to end of irrigation in the entire agricultural field, and the measured supply amount,
wherein, for each of the sections, the period of time during which irrigation water was supplied to the section is specified as a period from a time when the soil moisture content started to rise in the section until a time when a moisture content started to rise in a different section, and
wherein the supply amount of irrigation water is measured:
based on a number of times a pulse signal was obtained from a pulse-transmitting flow meter installed downstream of a water source of the drip irrigation system and that outputs the pulse signal every time a set amount of fluid flows, or
based on image data obtained from an imaging flow meter installed downstream of the water source of the drip irrigation system in time series.

4. The irrigation water amount measurement method according to claim 3, wherein, when the drip irrigation system supplies irrigation water with fertilizer mixed therein at a specific mixing rate to the agricultural field,
a supply amount of the fertilizer supplied to each of the sections is calculated using the specific mixing rate of the fertilizer.

5. A non-transitory computer-readable recording medium that includes a program recorded thereon for a computer to measure a supply amount of irrigation water in an agricultural field in which a drip irrigation system is installed, the program including instructions that cause a computer to carry out:
obtaining sensor data for specifying soil moisture contents in respective sections resulting from dividing the agricultural field into a plurality of pieces, from moisture sensors installed in the respective sections;
measuring the supply amount of irrigation water supplied from the drip irrigation system, in the agricultural field, during a period from start to end of irrigation;
specifying, for each of the sections, a period of time during which irrigation water was supplied to the section, based on a change state of the soil moisture content of the section specified by the sensor data; and
calculating, for each of the sections, the supply amount of irrigation water supplied to the section, based on a period of time specified for the section, the period from start to end of irrigation in the entire agricultural field, and the measured supply amount,
wherein, for each of the sections, the period of time during which irrigation water was supplied to the section is specified as a period from a time when the soil moisture content started to rise in the section until a time when a moisture content started to rise in a different section, and
wherein the supply amount of irrigation water is measured:
based on a number of times a pulse signal was obtained from a pulse-transmitting flow meter installed downstream of a water source of the drip irrigation system and that outputs the pulse signal every time a set amount of fluid flows, or
based on image data obtained from an imaging flow meter installed downstream of the water source of the drip irrigation system in time series.

6. The non-transitory computer-readable recording medium according to claim 5,
wherein, when the drip irrigation system supplies irrigation water with fertilizer mixed therein at a specific mixing rate to the agricultural field, a supply amount of the fertilizer supplied to each of the sections is calculated using the specific mixing rate of the fertilizer.

\* \* \* \* \*